(12) United States Patent
Gales et al.

(10) Patent No.: US 8,181,767 B2
(45) Date of Patent: May 22, 2012

(54) PRODUCT INVERTING MECHANISM

(75) Inventors: Charles C. Gales, Lancaster, PA (US); Mark Alan Killian, Lancaster, PA (US)

(73) Assignee: Weldon Machine Tool, Inc., York, PA (US)

( * ) Notice: Subject to any disclaimer, the term of this patent is extended or adjusted under 35 U.S.C. 154(b) by 155 days.

(21) Appl. No.: 12/712,485

(22) Filed: Feb. 25, 2010

(65) Prior Publication Data
US 2010/0219042 A1 Sep. 2, 2010

Related U.S. Application Data

(60) Provisional application No. 61/155,983, filed on Feb. 27, 2009.

(51) Int. Cl.
*B65G 47/22* (2006.01)
(52) U.S. Cl. .............. 198/404; 198/626.1; 198/690.1
(58) Field of Classification Search .......... 198/402–404, 198/626.1–626.6, 689.1, 690.1
See application file for complete search history.

(56) References Cited

U.S. PATENT DOCUMENTS

| | | | | |
|---|---|---|---|---|
| 1,970,749 A | * | 8/1934 | Heichert | 198/404 |
| 4,136,767 A | * | 1/1979 | Sarovich | 198/404 |
| 4,232,777 A | * | 11/1980 | Smith et al. | 198/404 |
| 4,354,788 A | * | 10/1982 | Giusti | 414/791.3 |
| 4,699,564 A | * | 10/1987 | Cetrangolo | 414/765 |
| 4,798,278 A | * | 1/1989 | Cornacchia | 198/399 |
| 6,073,748 A | * | 6/2000 | Douglas | 198/404 |
| 6,142,287 A | * | 11/2000 | Biffert et al. | 198/404 |
| 6,230,360 B1 | | 5/2001 | Singleton et al. | |
| 6,527,100 B2 | * | 3/2003 | Ballestrazzi et al. | 198/373 |
| 6,578,700 B2 | * | 6/2003 | Smith et al. | 198/403 |
| 7,175,017 B2 | * | 2/2007 | Carey et al. | 198/412 |
| 2010/0094454 A1 | * | 4/2010 | Depot et al. | 700/230 |

FOREIGN PATENT DOCUMENTS

| | | | | |
|---|---|---|---|---|
| JP | 57019218 A | * | 2/1982 | 198/403 |
| JP | 62218311 A | * | 9/1987 | 198/404 |
| WO | 2008/154751 A1 | | 12/2008 | |

* cited by examiner

*Primary Examiner* — Mark A Deuble
(74) *Attorney, Agent, or Firm* — McNees Wallace & Nurick LLC

(57) ABSTRACT

The invention is directed to an inverting device which takes one or more articles from a first device, inverts the article(s), and discharges the article(s) onto a second device that may be at essentially the same relative height as the first device. The inverting device has a rotating device with two opposed surfaces that are spaced apart a distance slightly greater than the height of the article. Once the article(s) has been moved into position in the rotating device, the rotating device rotates 180 degrees about a transverse axis, resulting in the inversion of the article. The new orientation of the article may facilitate further processing in a manufacturing environment, such as cleaning, filling, labeling, stacking or any other activity that relies on a specific product disposition.

14 Claims, 10 Drawing Sheets

PRODUCT INVERTING MECHANISM

FIELD OF THE INVENTION

The present invention is directed to an apparatus for inverting articles, and more particularly to an apparatus for inverting baking pans used in commercial baking.

BACKGROUND OF THE INVENTION

In the wholesale baking industry, automated systems and processes are used to produce baked products, such as breads, rolls, buns and the like, in large volumes and typically in a generally continuous manner. The pans within which such bread products are baked are usually displaced by conveyors to facilitate the movement of a large number of these baking pans, whether before, during or after the actual baking process, from one location within the establishment to another.

Generally, the baking pans are oriented with their open side up to accept dough and continue through the baking process. Once emptied of its baked contents, it is often advantageous to invert the pan or turn the pan upside down until its next use. This prevents unwanted debris from gathering inside of the pan. In addition, it is easier to clean an upside down pan, since gravity may assist brushes, air jets, etc. with removal of debris. When not in use, pans are stacked and removed from the baking line. Pans that are upside down create a more stable stack that is less prone to damage.

Typically, the prior art pan inverting systems include some type of rotating drum or wheel, having a number of radially extending flaps or clamps on which pans are loaded, one pan per paddle or clamp on the rotating drum/wheel. Once one or more pans are loaded, the wheel is rotated, thereby turning the pans end-over-end to turn them upside down before being unloaded from the wheel.

U.S. Pat. No. 6,230,360 discloses a baked good pan cleaner in which the pans are inverted solely for cleaning. In one embodiment, a pan flipper and cleaning brushes are provided to clean out a bakery pan. This approach utilizes a pan "gripper and flipper" which will grab the leading edge of a pan and flip it over so it is upside down. The pan then will be caught between a guide and rotating cleaning brushes, but, the pan being upside down, the debris and other matter dislodged by the cleaning brushes or gravity will fall into a catch pan located beneath the conveyor, under the rotating cleaning brushes. As the pan moves out from the rotating brushes, it engages a second pan gripper/flipper which catches the leading edge of the pan and rotates it over, so it is now right-side-up again, and either onto a conveyor or onto a stacker.

PCT Publication Number WO 2008/154751 discloses a pan inverting system having a rotating table. The table has substantially parallel pan-receiving surfaces on opposite sides of the table. The table is rotatably mounted within a frame for rotation about a longitudinal axis of the table. A pan engagement mechanism is disposed within the table and is operable to releasably fasten the pans to the pan-receiving surfaces of the table, such that when the pans are fastened to the pan-receiving surface by the pan-engagement mechanism, rotation of the table about the longitudinally extending axis will invert the pan.

Thus, while there have been various previous attempts to provide pan inverting systems, there are disadvantages associated with these known systems. With many prior art pan inverters, the process of inverting the pans twice can be quite time-consuming. In a continuous and high-volume production setting, any pan inverting system employed must be able to accommodate the very high throughput which is now required in most modern commercial bakeries. In addition, some of the prior art inverters do not allow the pan feed belt and pan removal belt to be at the same relative height. This can cause difficulties in a continuous baking line.

It would, therefore, be advantageous to provide a pan inverting device which eliminates the problems associated with the prior art and one which is capable of accommodating the full range of potential pan sizes typically found in a wholesale bakery.

SUMMARY OF THE INVENTION

The invention is directed to an inverting device which takes one or more articles from a first device, inverts the article(s), and discharges the article(s) onto a second device that may be at essentially the same relative height as the first device. The inverting device has a rotating device with two opposed surfaces that are spaced apart a distance slightly greater than the height of the article. Once the article(s) has been moved into position in the rotating device, the rotating device rotates 180 degrees about a transverse axis, resulting in the inversion of the article. The new orientation of the article may facilitate further processing in a manufacturing environment, such as cleaning, filling, labeling, stacking or any other activity that relies on a specific product disposition.

One aspect of the invention is directed to a pan inverting apparatus for inverting baking pans. The pan inverting apparatus has a rotating device rotatably mounted to a frame about a transverse axis which extends through the center of the rotating device. A first conveyor is positioned on the rotating device and has a first pan-receiving surface. A second conveyor is also positioned on the rotating device and has a second pan-receiving surface which is opposed to the first pan-receiving surface. The first pan-receiving surface is spaced from the second pan-receiving surface a distance greater than the height of the largest baking pan which is to be inverted in the pan inverting apparatus.

Another aspect of the invention is directed to the pan inverting having a rotating device rotatably mounted to a frame. The rotating device is rotatable about an axis which extends through the rotating device. A first conveyor is positioned on the rotating device and has a first pan-receiving surface. The first pan-receiving surface is provided on an inside surface of the first conveyor relative to the arc of rotation. A second conveyor is positioned on the rotating device and has a second pan-receiving surface which is opposed to the first pan-receiving surface. The second pan-receiving surface is provided on an inside surface of the second conveyor relative to the arc of rotation. The forces associated with the rotation of the rotating device force the baking pans toward the respective pan-receiving surfaces, thereby applying additional forces to maintain the baking pans in engagement with the respective pan-receiving surfaces.

Another aspect of the invention is directed to a pan inverting station for inverting baking pans which are received from a feed belt and discharged to a removal belt. The pan inverting station has a rotating device rotatably mounted to a frame of a pan inverting apparatus. The rotating device is rotatable about an axis which extends through the rotating device. A first conveyor is positioned on the rotating device. The first conveyor has a first pan-receiving surface for receiving respective baking pans from the feed belt when the rotating device is in a first position and discharging the respective baking pans to the discharge belt when the rotating device is in a second position. A second conveyor is positioned on the rotating device. The second conveyor has a second pan-receiving surface which is opposed to the first pan-receiving surface, the second pan-receiving surface for receiving other respective baking pans from the feed belt when the rotating device is in the second position and discharging the other respective baking pans to the discharge belt when the rotating device is in the first position. The pan inverting apparatus allows the baking pans to enter and leave the pan inverting apparatus at the same relative height, thereby facilitating the movement of the baking pans in a baking line in which the pan inverting apparatus is positioned.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
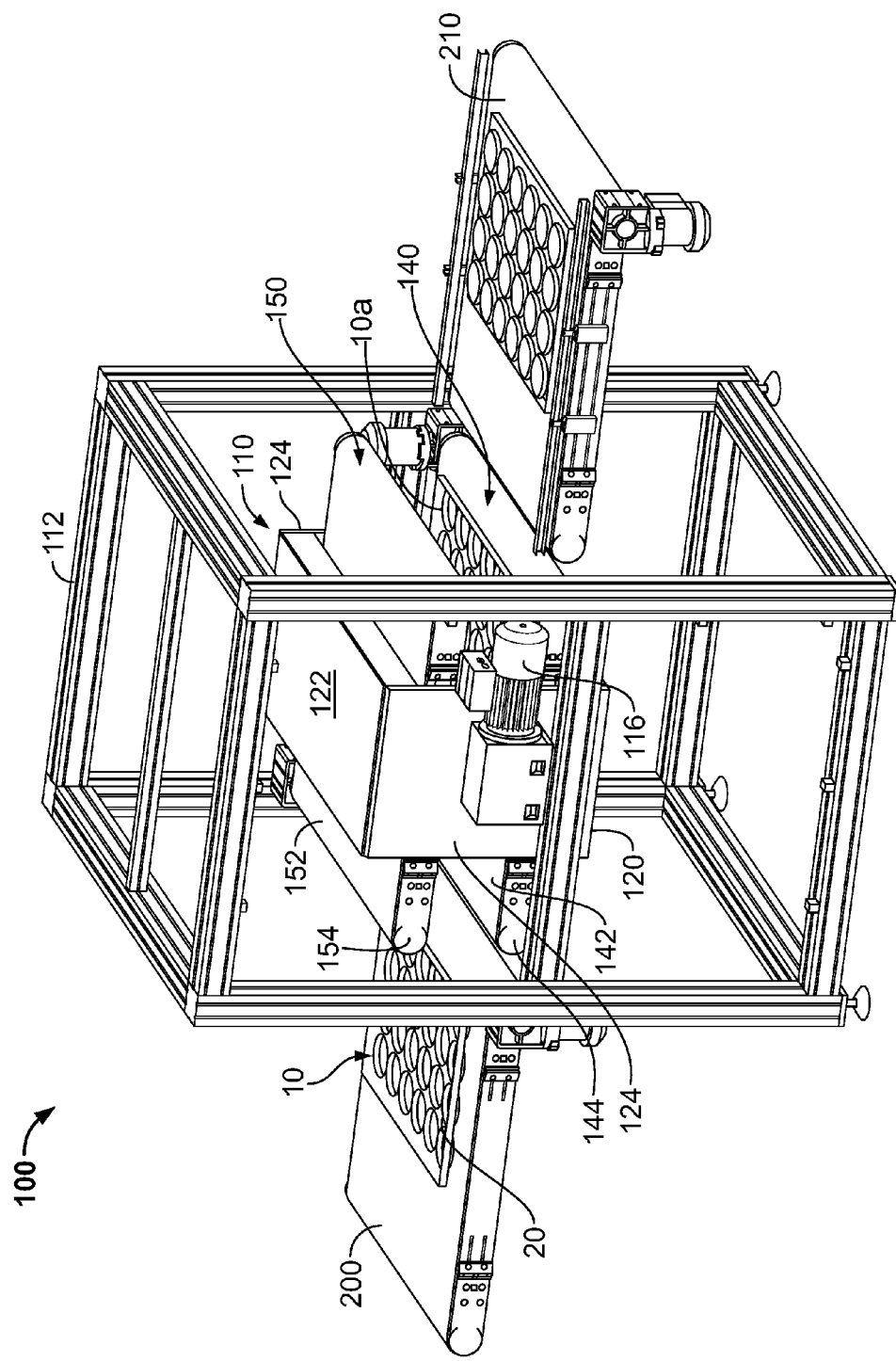
FIG. 1 is a perspective view of an embodiment of a pan inverting device with a baking pan being inserted onto a first conveyor of a rotating device.

It is desirable to be able to quickly and reliably invert baking pans 10 in the wholesale baking industry, whether such inversions turn the pans upside down or right-side-up. To facilitate this process, the invention is directed to a pan inverting apparatus or device 100 which can be placed in the baking line. In many applications, two pan inverting devices are used in the same line. The first pan inverting device turns pans upside down after the baked product has been removed from the pan, and the second pan inverting device turns pans right-side-up so that they may be filled with dough. However, in some applications, e.g., those in which the pans are to be stacked, only one pan inverting device may be utilized.

As shown in FIGS. 1 through 8, each pan inverting device 100 has a rotating device 110 which is rotatably mounted within a static frame 112, such as to permit the entire rotating device 110 to rotate about a transverse axis 114 (FIG. 5) of the rotating device 110. The rotating device may be trunnion-mounted to the frame 112. Generally, rotation of the rotating device 110 occurs in 180 degree increments. Rotation of the rotating device 110 in either direction about the transverse axis 114 is possible. The transverse axis 114 preferably extends through the center of the rotating device 110, relative to both the length and height dimensions. Although two successive rotations of 180 degrees in the same rotational direction are possible, it is preferable for practical reasons that the rotating device 110 is first rotated 180 degrees in one direction and then next rotated back in the opposite direction. Regardless, the rotating device 110 will always rotate about the transverse axis 114, or rotatably reciprocate about the transverse axis 114, such that the rotating device 110 remains substantially in the same position within the frame 112 at all stopped positions. Rotation of the rotating device 110 is generated by a suitable motor 116 (FIG. 1), such as for example, an electrical servo or step motor.

Figure 10:
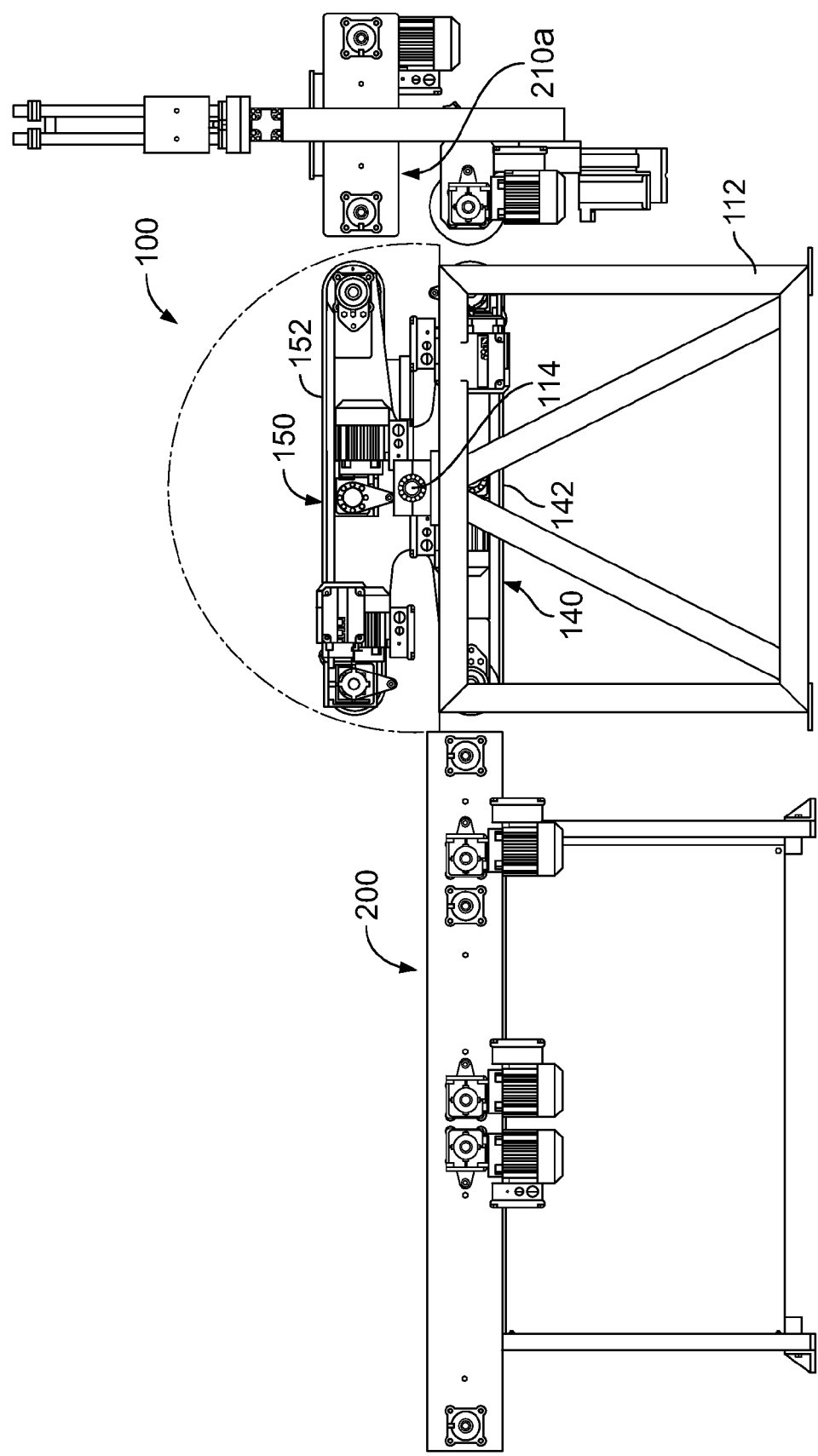
FIG. 10 is an elevation view of alternative pan inverting device, showing an inverted removal belt which allows the inverted pans to be easily cleaned.

As is shown in FIG. 1, the rotating device 110 is supported on the frame 112 or any other structure capable of supporting the weight of the rotating device 110 and allowing the rotating device 110 to rotate about a transverse axis. The rotating device 110 has a first wall 120, a second wall 122 and two sidewalls 124 which connect the first wall 120 to the second wall 122. In the position shown in FIGS. 1 and 5, the first wall 120 is the bottom wall and the second wall 122 is the top wall. Alternatively, as best shown in FIG. 10, the first and second walls may be removed and replaced by support members which extend between the sidewalls. The motor 116 is mechanically connected to a respective sidewall 124 by a shaft (not shown) or the like. The shaft is positioned at the center of the sidewall 124 at the transverse axis 114, thereby allowing the rotating device 110 to rotate about the transverse axis 114 as shown in the drawings.

Figure 9:
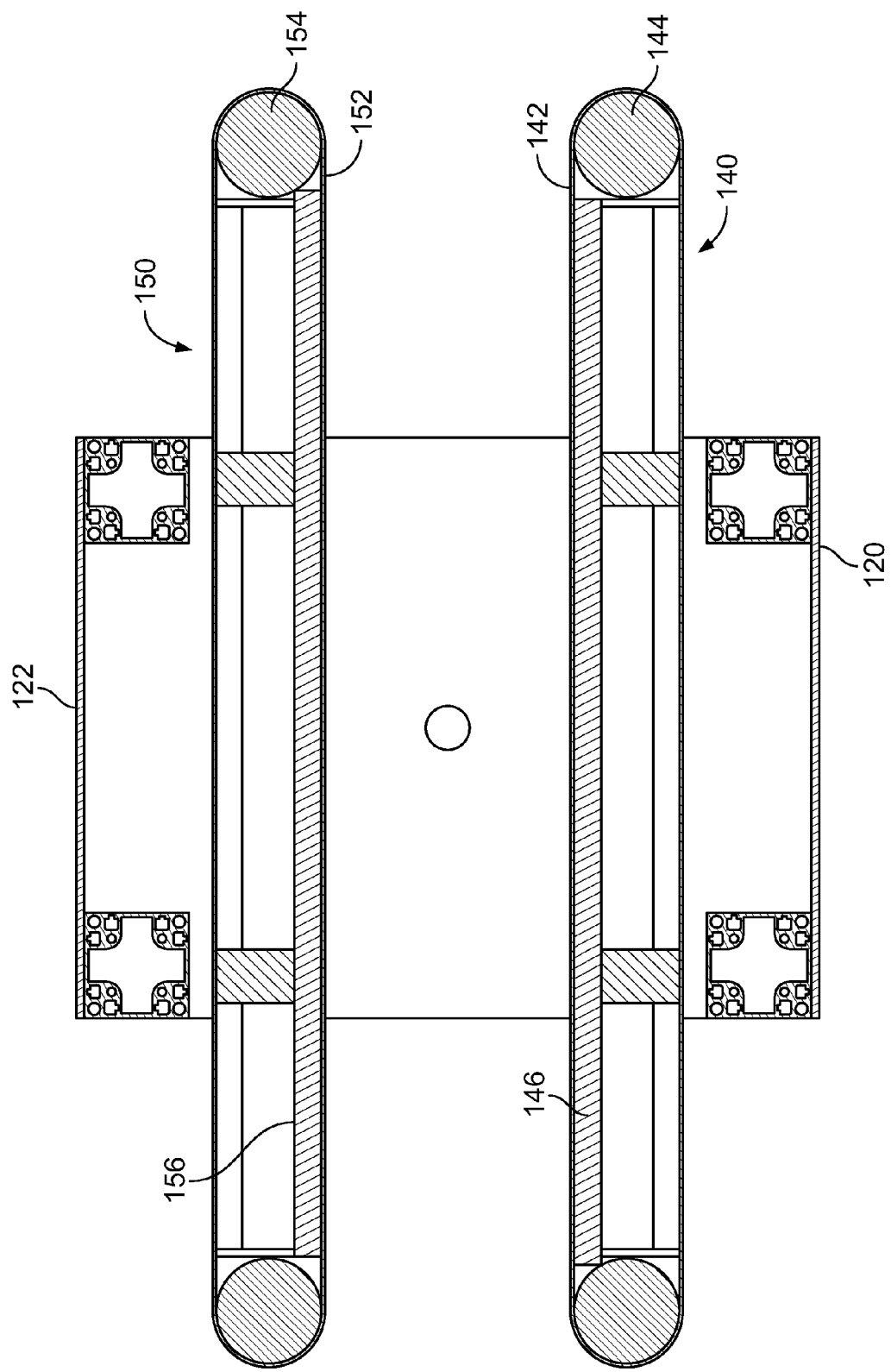
FIG. 9 is an enlarged view of the pan inverting device with no pans positioned thereon, showing magnets positioned proximate the first and second conveyer.

Extending from the first wall 120 is a first conveyor 140. The first conveyor 140 has a belt 142 which moves in a conventional manner about conveyor supports 144. The first conveyor has a first pan-engagement mechanism which will engage the baking pan and cause the baking pan to be maintained in position on the first conveyor belt as the rotating device is rotated and the baking pan is inverted. In the embodiment shown, the first conveyer 140 produces a magnetic force which will attract the pans 10. The magnetic force may be generated by the use of conventional magnets 146 (FIG. 9) which are located proximate the belt 142, or the belt 142 may be made of material which can exhibit magnetic properties.

Extending from the second wall 122 is a second conveyor 150. The second conveyor 150 has a belt 152 which moves in a conventional manner about conveyor supports 154. The second conveyor has a second pan-engagement mechanism which will engage the baking pan and cause the baking pan to be maintained in position on the second conveyor belt as the rotating device is rotated and the baking pan is inverted. In the embodiment shown, the second conveyer 150 produces a magnetic force which will attract the pans 10. The magnetic force may be generated by the use of conventional magnets 156 (FIG. 9) which are located proximate the belt 152, or the belt 152 may be made of material which can exhibit magnetic properties.

The first conveyor 140 and the second conveyor 150 may be essentially mirror images of each other. The first conveyer 140 and the second conveyor 150 have opposed pan-receiving surfaces 148, 158 (FIGS. 5-8) which are spaced from each other a distance X which is slightly greater than the height Y of the largest pan 10 to be used in the baking line in which the rotating device 110 is positioned.

The magnets 146, 156 may include, but are not limited to, permanent magnets, electromagnets or a combination thereof. The force generated by the magnets must be sufficiently strong to attract the metal baking pans 10 fed on the first conveyor 140 or second conveyor 150 and retain the pans 10 in place as the rotating device 110 is rotated, thereby inverting the pans 10. If permanent magnets are used, the motion of the conveyors 140, 150, when actuated, must be sufficient to dislodge the pans 10 from their fixed position, such as to allow them to be displaced along the pan-receiving surfaces 148, 158 while still being maintained in physical engagement with the pan-receiving surfaces 148, 158. If electromagnets are used, the amount of magnetic force produced can be controlled by an electric rheostat or the like to produce a variable magnetic force to allow the pans 10 to be displaced along the pan-receiving surfaces 148, 158 while still being maintained in physical engagement with the pan-receiving surfaces 148, 158.

Figure 2:
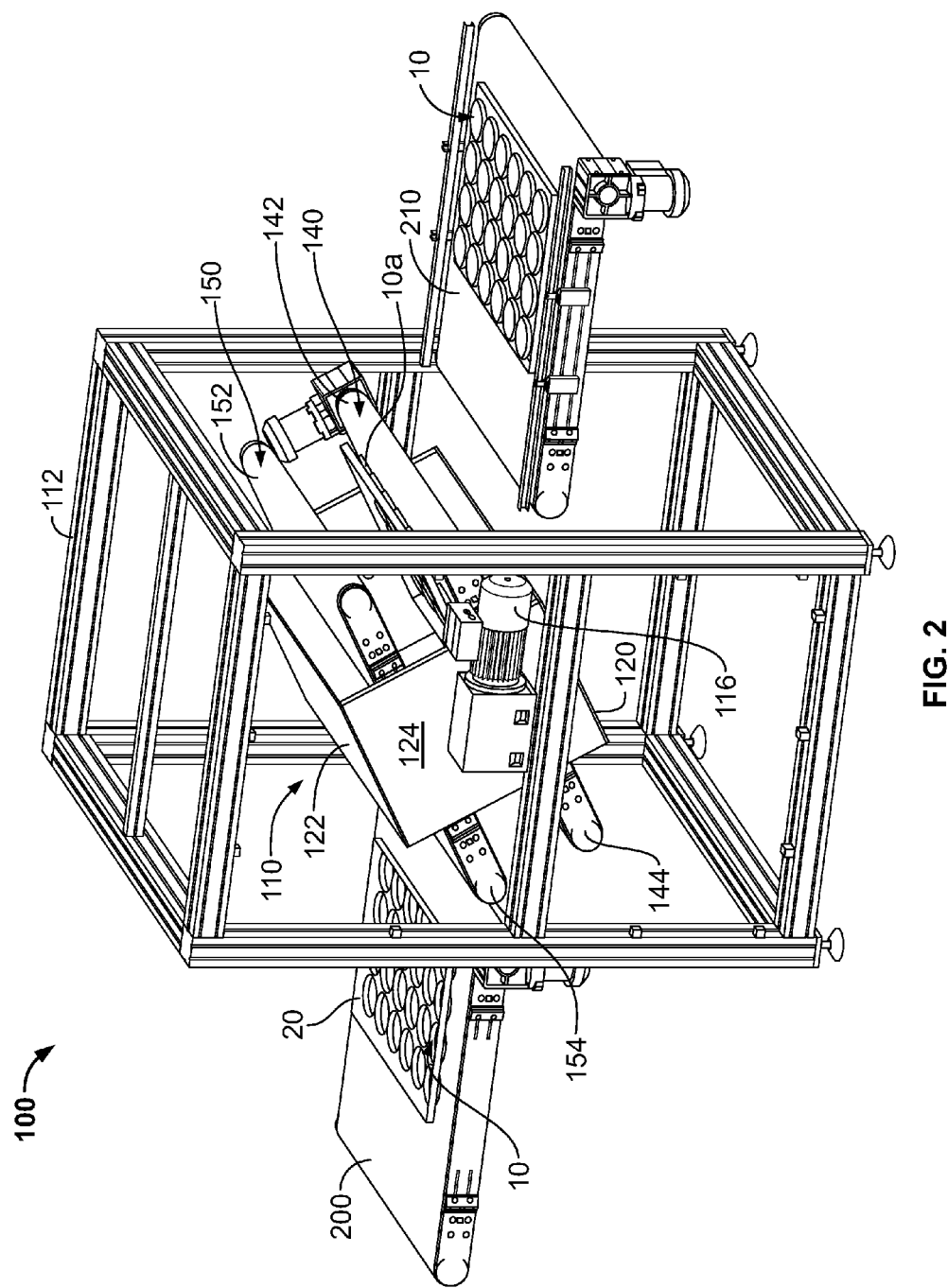
FIG. 2 is a perspective view of the pan inverting device of FIG. 1 showing the rotating device being rotated about a transverse axis to invert the baking pan.

In operation, a first respective pan 10*a* is advanced from the feed belt 200 of the baking line to the first conveyor 140. The first respective pan 10*a* is advanced to the position shown in FIG. 1. As the feed belt 200 and the first conveyor 140 are in the same plane, the first respective pan 10*a* is easily moved from the feed belt 200 to the first conveyor 140. This facilitates the continuous movement of the pans 10 as required in many applications in the baking industry. As the first respective pan 10*a* is moved onto the first conveyor 140, the magnetic force generated by the magnets 146 of the first conveyor 140 causes the first respective pan 10*a* to be attracted to the pan-receiving surface 148 of the belt 142 of the first conveyor 140. Once the first respective pan 10*a* is properly positioned, a sensing mechanism (not shown) recognizes that the first respective pan 10*a* is properly positioned and sends a message to a controller (not shown) that controls the rotating device 110. The controller then causes the motor to rotate the rotating device 110 about the transverse axis 114, as shown in FIG. 2 (and FIG. 6). As the rotation occurs, the magnetic force of the first magnets 146 of the first conveyor 140 cooperates with the first respective pan 10*a* to maintain the first respective pan 10*a* in engagement with pan-receiving surface 148 of the belt 142 of the first conveyor 140. As the first respective pan 10*a* is provided on an inside surface of the first conveyor 140 relative to the arc of rotation, the forces associated with the rotation of the rotating device 110 force the first respective pan 10*a* toward the belt 142, thereby applying additional forces to maintain the first respective pan 10*a* in engagement with the pan-receiving surface 148 of the belt 142 of the first conveyor 140.

Figure 3:
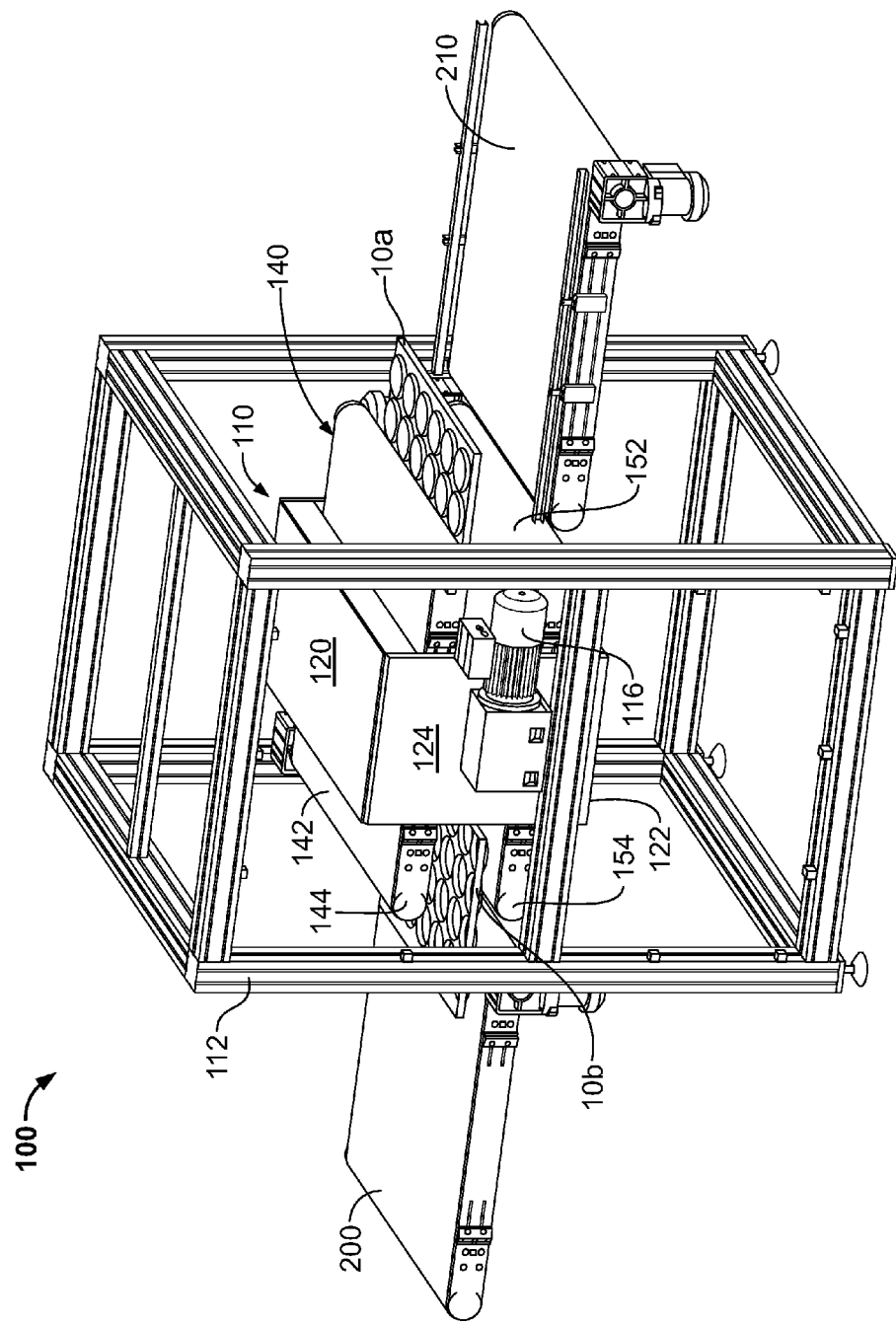
FIG. 3 is a perspective view of the pan inverting device of FIG. 1 showing the rotating device rotated 180 degrees and the pan in the inverted position relative to FIG. 1.
Figure 4:
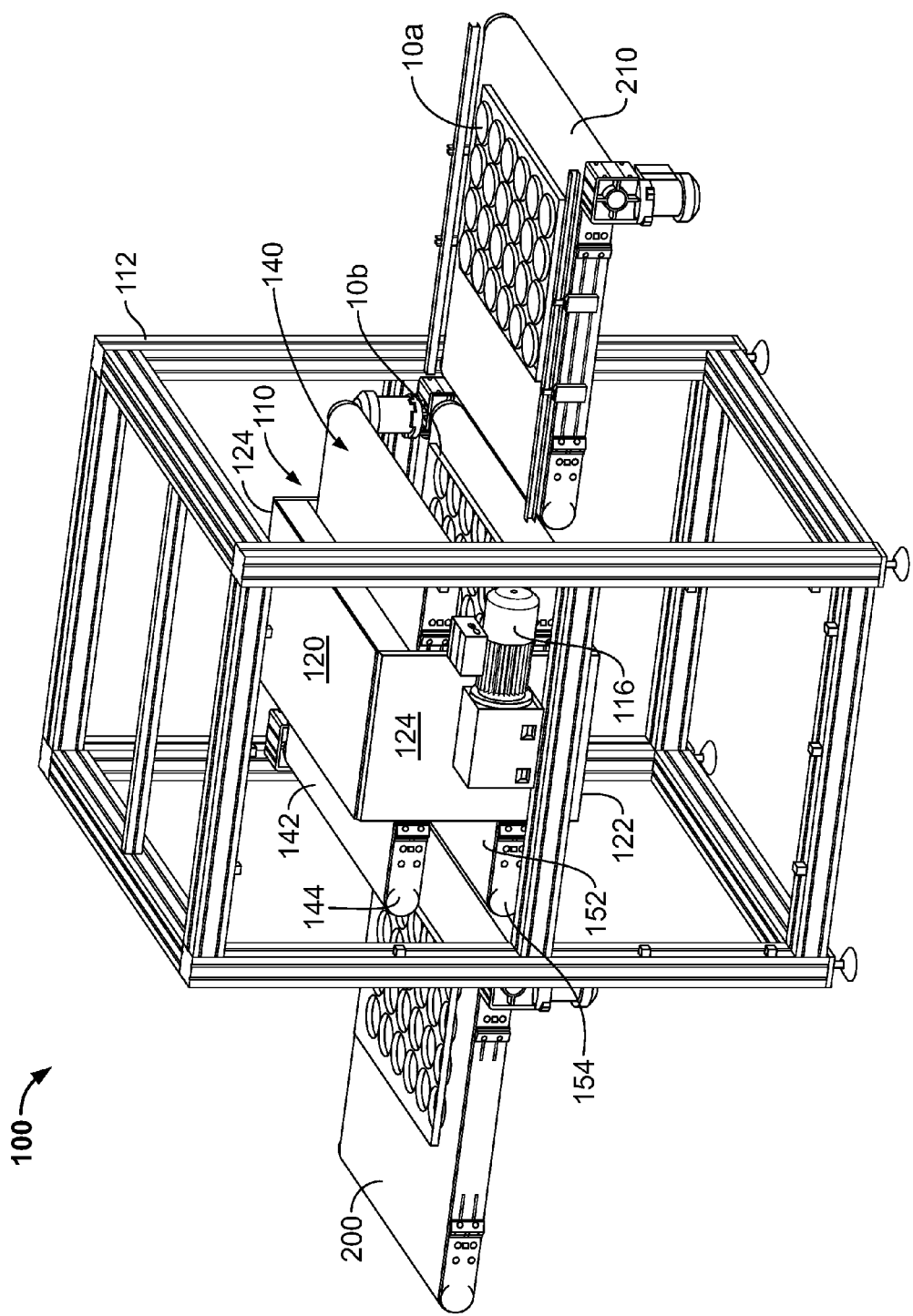
FIG. 4 is a perspective view of the pan inverting device of FIG. 1 showing the inverted pan of FIG. 3 removed from the fist conveyor to a removal belt and a new baking pan being inserted onto a second conveyor of the rotating device.
Figure 5:
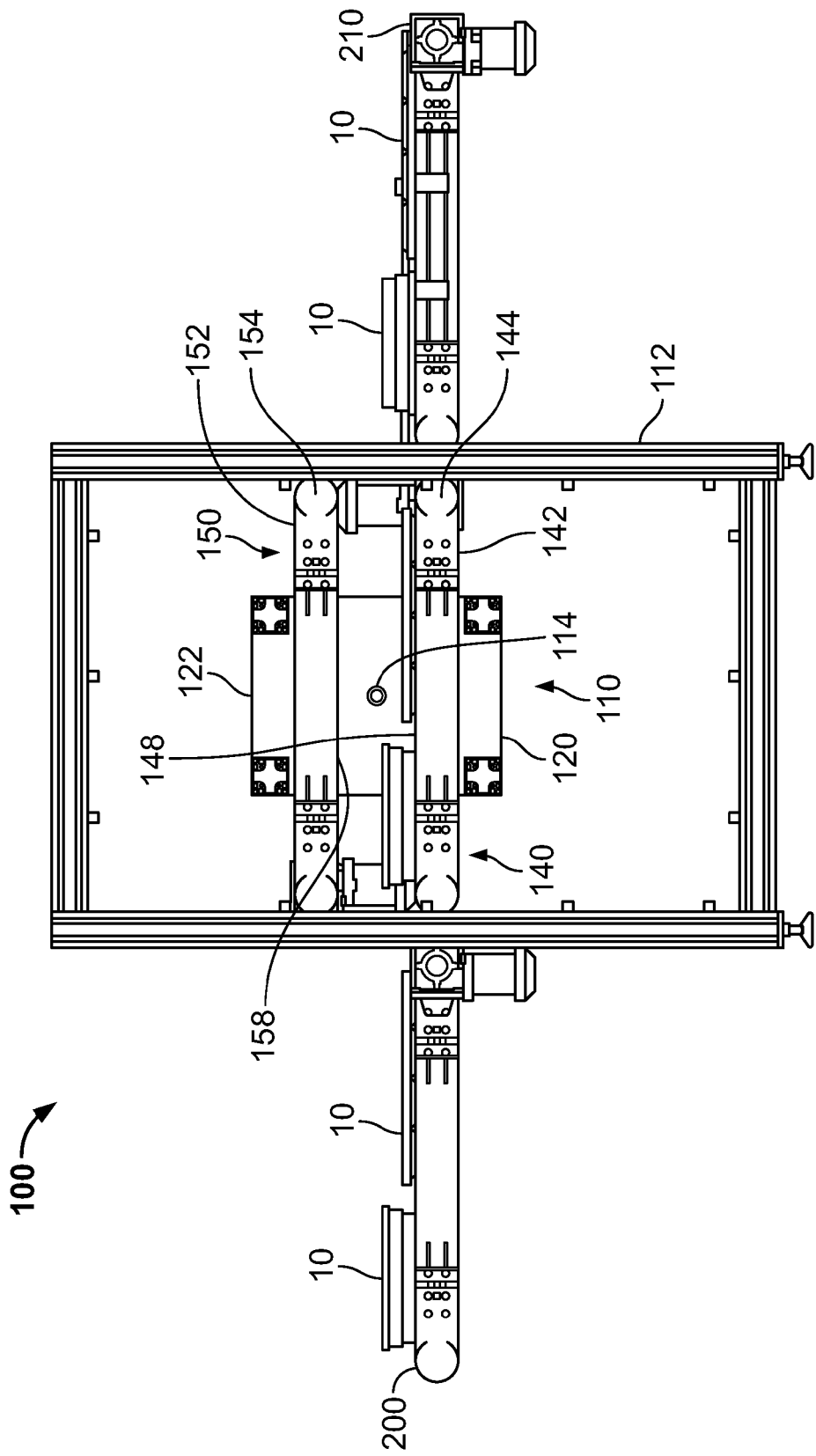
FIG. 5 is an elevation view of the pan inverting device of FIG. 1, with an end of the rotating device removed, showing two baking pans of different configuration being inserted onto the first conveyor of the rotating device.
Figure 6:
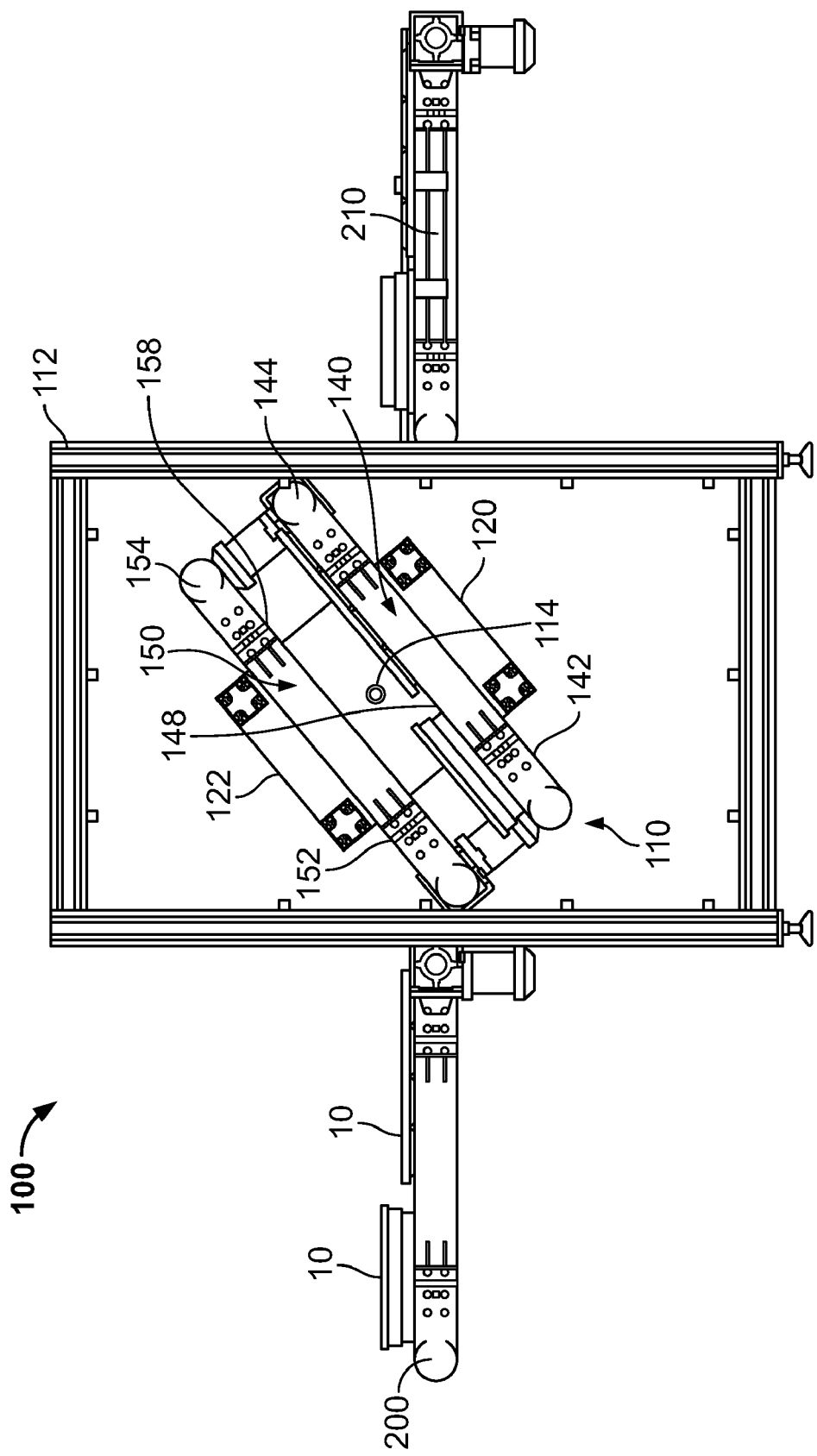
FIG. 6 is an elevation view of the pan inverting device of FIG. 5 showing the rotating device being rotated about a transverse axis to invert the baking pans.
Figure 7:
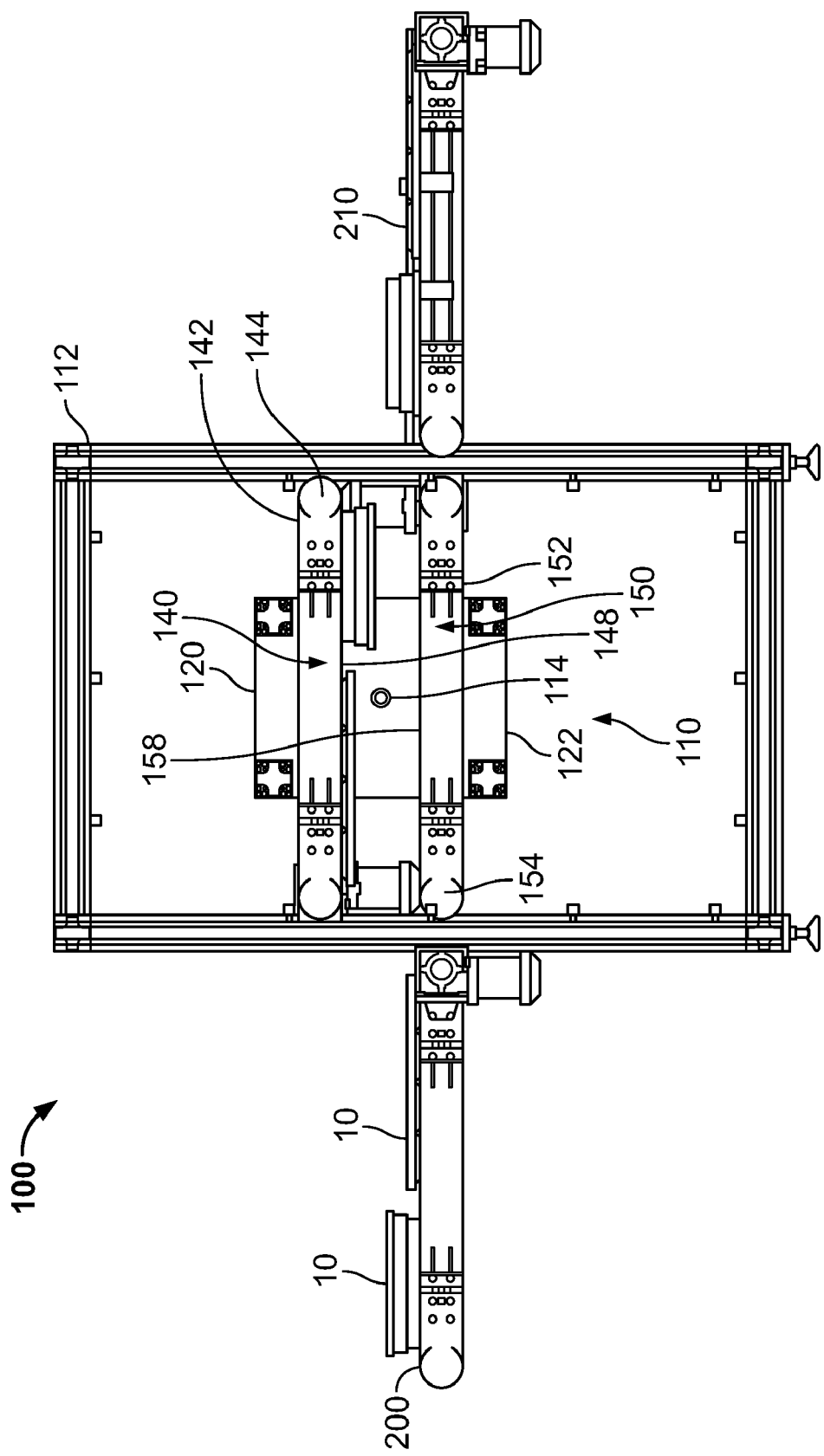
FIG. 7 is an elevation view of the pan inverting device of FIG. 5 showing the rotating device rotated 180 degrees and the baking pans in the inverted position relative to FIG. 5.
Figure 8:
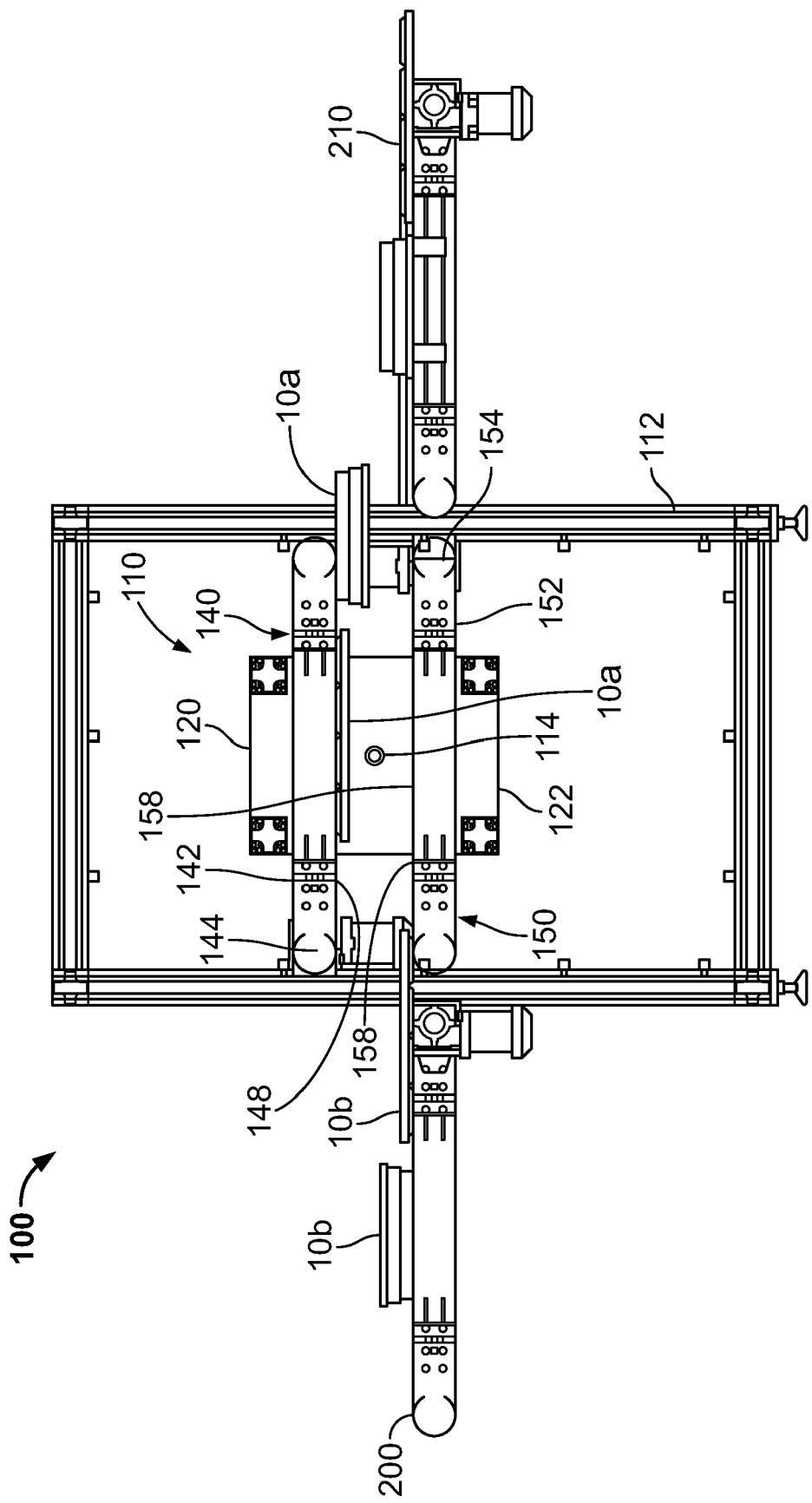
FIG. 8 is an elevation view of the pan inverting device of FIG. 5 showing the inverted pans of FIG. 7 being removed from the fist conveyor to the removal belt and new baking pans being inserted onto the second conveyor of the rotating device.

The rotation of the rotating device 110 is continued until the first conveyor 140 reaches the position shown in FIG. 3 (and FIG. 7), in which the first respective pan 10*a* has been rotated 180 degrees. In this position, the first wall 120 is now the top wall and the second wall 122 is the bottom wall. Consequently, the first respective pan 10*a* on the pan-receiving surface 148 of the belt 142 of the first conveyor 140 is now inverted (or upside down as shown in FIG. 3). Due to the magnetic force generated by the magnets 146 of the first conveyor 140, the first respective pan 10*a* is maintained on the pan-receiving surface 148 of the belt 142 of the first conveyor 140. Once this position is reached, the controller advances the belt 142 of the first conveyor 140, causing the inverted first respective pan 10*a* to be moved toward the removal belt 210 (as shown in FIG. 8). As this occurs, the magnetic force exerted on the first respective pan 10*a* will lessen, as less surface area of the first respective pan 10*a* remains in contact with the belt 142 of the first conveyor 140. Additionally, if the magnetic force is an electromagnetic force, the intensity of the force can be controlled, as was previously described. Consequently, as the first respective pan 10*a* is discharged from the first conveyor 140, the weight of the first respective pan 10*a* will cause the first respective pan 10*a* to transfer from the first conveyor 140 onto the removal belt 210. The removal belt 210 may be padded at the point of impact, thereby preventing damage to the first respective pan 10*a* as it transfers to the removal belt 210. As shown in FIG. 4, the first respective pan 10*a* is then moved away from the rotating device 110 to continue with the other processes involved in the baking line.

It should be noted that an initial portion 210*a* of the removal belt 210 may also be magnetized and positioned at the same level as the first conveyor 140, as is shown in FIG. 10. In this case, when the first conveyor 140 discharges the first respective pan 10*a*, the first respective pan 10*a* would be engaged by the magnetized removal belt 210*a*, causing the first respective pan 10*a* to have its baking surface 20, into which all the baking ingredients are inserted, downwardly exposed. This would allow the exposed baking surface 20 of the first respective pan 10*a* to be cleaned by cleaning devices (not shown) positioned below the removal belt 210*a*. Once the cleaning is accomplished, the first respective pan 10*a* would be moved beyond the magnetized removal belt 210*a*. As this occurs, the magnetic force exerted on the respective first pan 10*a* would lessen, as less surface area of the first respective pan 10*a* remains in contact with the magnetic portion of the removal belt 210*a*. Consequently, as the first respective pan 10*a* is moved from the magnetized portion of the removal belt 210*a*, the weight of the first respective pan 10*a* would cause the first respective pan 10*a* to transfer from the magnetized portion of the removal belt 210*a* onto the conventional portion of the removal belt. The conventional portion of the removal belt may be padded at the point of impact, thereby preventing damage to the first respective pan 10*a* as it transfers.

Simultaneously with the advancement of the first respective pan 10*a* to the removal belt 210, a second respective pan 10*b* is advanced from the feed belt 200 to the second conveyor 150 (as best shown in FIG. 8). The second respective pan 10*b* is advanced to the position shown in FIG. 4 (which is identical to the position of the first respective pan 10*a* in FIG. 1). As the feed belt 200 and the second conveyor 150 are in the same plane, the second respective pan 10*b* is easily moved from the feed belt 200 to the second conveyor 150. As previously stated, this facilitates the continuous movement of the pans 10 as required in many applications in the baking industry. As the second respective pan 10*b* is moved onto the second conveyor 150, the magnetic force generated by the magnets 156 of the second conveyor 150 causes the second respective pan 10*b* to be attracted to the pan-receiving surface 158 of the belt 152 of the second conveyor 150. Once the second respective pan 10*b* is properly positioned, the sensing mechanism recognizes that the second respective pan 10*b* is properly positioned and sends a message to the controller. The controller also recognizes when the first respective pan 10*a* has been properly discharged to the removal belt 210. The controller then causes the motor to rotate the rotating device 110, as shown in FIG. 2, and the process or sequence recited above with respect to the first respective pan 10*a* is repeated for the second respective pan 10*b*. This repetition occurs until all of the pans 10 have been properly fed through the pan inverting device 100. As previously recited, the opposed pan-receiving surfaces 148, 158 of the first conveyer 140 and the second conveyor 150 are spaced from each other a distance X which is slightly greater than the height Y of the largest pan to be used in the baking line in which the rotating device 110 is positioned. As the first respective pan 10a is discharged by the first conveyor 140 and the second respective pan 10b is fed onto the second conveyor 150, the first respective pan 10a and the second respective pan 10b are always laterally offset from each other, thereby allowing the spacing X between the first conveyor and the second conveyor to be minimized.

Referring to FIGS. 5 through 8, the pan inverting apparatus 100, feed belt 200 and removal belt 210 are identical to that shown in FIGS. 1 through 4. However, in FIGS. 5 through 8, different sizes and types of baking pans 10 are shown. This exemplifies the universal natures of the pan inverting apparatus 100. While baking pans 10 of various configurations are shown, this is for illustrative purposes. In use, pans of different sizes would not be fed into the pan inverting apparatus 100 at the same time. In particular, this illustrates that the opposed pan-receiving surfaces 148, 158 of the first conveyor 140 and the second conveyor 150 are spaced from each other a distance X which is greater than the height Y of the largest pan to be used in the baking line in which the rotating device 110 is positioned. As the rotating device 110 can accommodate all sizes and shapes of baking pans used, no down time is required to change the configuration of the rotating device 110 as different types of baking pans are introduced.

The pan inverting apparatus or device 100 is part of a pan inverting station which is incorporated into the baking line. The feed belt 200 and removal belt 210 are positioned at the same relative height to the rotating device 110, thereby allowing the baking pans 10 to enter and leave the pan inverting station at the same relative height, thereby facilitating the movement of the baking pans in a baking line in which the pan inverting device 100 is positioned.

As previously discussed, the rotating device 110 can also take upside down pans and rotate them to the right-side-up position. The process is essentially identical to that described above, except that the pans are delivered by the feed belt 200 in the upside down position and are inverted by the rotating device 110 and discharged to the removal belt 210 in the right-side-up position. During this operation, cleaning of the pans 10 would generally not occur, as the pans 10 are in the right-side-up position upon discharge.

The rotating device 110 also allows the pans to be inverted regardless of the orientation in which the pans 10 are fed from the feed belt 200. For example, if the pans 10 are fed in a longitudinally extending direction, the rotating device 110 will invert the pans 10 and advance them to the removal belt 210 in the same longitudinal orientation. Similarly, if the pans 10 are fed in a transversally extending direction, the rotating device 110 will invert the pans 10 and advance them to the removal belt 210 in the same transverse orientation.

As the rotating device 110 is in-line in a complete baking line, it is likely that the pans 10 need not be inverted with each pass through the rotating device 110. In such cases, the pans 10 are fed by the feed belt 200 to the first conveyor 140 or second conveyor 150, whichever conveyor is in the plane of the feed belt 200. In this instance, the conveyor performs as a typical conveyor and merely advances the pan through the rotating device 110 to the removal belt 210. In such cases, the rotating device 110 does not invert the pans 10.

In a continuous baking line, it can be important for the feed belt 200 and removal belt 210 to be positioned at the same relative height, as it can be difficult to design a continuous baking line in which all of the belts are at different heights. The design of the pan inverting device 100 described herein allows the pans 10 to enter and leave the rotating device 110 at the same height, thereby facilitating the overall function of the baking line.

As the feed belt 200 and the respective conveyor onto which the pan 10 is being fed are also in the same plane, the pan 10 is properly supported on its bottom surface. This reduces the possibility of a misfeed or improper alignment of the pans 10 when moving from the feed belt 200 to the respective conveyor, thereby allowing for the continuous feed of the pans 10 without interruption.

The configuration of the rotating device 110 and the conveyors 140, 150 provides for proper position of the pans 10 during rotation of the rotating device 110. As previously discussed, the magnetic force and the forces associated with the rotational movement of the rotating device 110 all act in the same direction to keep the pan 10 properly seated. As the pans 10 are positioned on an inside surface of the conveyors 140, 150 relative to rotation, the rotational forces caused by the rotation of the rotating device 110 act to keep the pan 10 seated, rather than acting to pull the pan away from the belt 142, 152 (as in the prior art). Consequently, smaller magnets 146, 156 may be used. In applications in which the pan engagement mechanisms are vacuum heads which can create suction, clamps driven by pneumatic cylinders, or with other types of devices to hold the objects in place, the size of the devices may be reduced as the pans are positioned on an inside surface of the conveyors relative to rotation, thereby allowing the rotational forces caused by the rotation of the rotating device to act to keep the pan seated, rather than acting to pull the pan away from the belt.

The use of the magnets 146, 156 or the magnetic conveyors eliminates the need to have other types of guides, clamps or other restraints to hold the pans 10 in place as the pans 10 are inverted. This allows for a more continuous flow of the pans 10. This also allows the pan inverting device 100 and the rotating device 110 to be universally used for all types of pans of all sizes. In the baking industry it is common to use the same line to bake different products, i.e. different breads, rolls, etc. Previously, this often required equipment change-over to allow for the use of the different pans. However, with this pan inverting device 100, the conveyors 140, 150 do not use special clamps and are spaced apart to allow for the use of many types of pans 10 with no change-over required.

The adaptability and programmability of the rotating device 110 is also advantageous. As previously described, the rotating device 110 can be used to invert pans 10 or simply feed the pans 10 through without inverting. This allows the inversion of the pans 10, and therefore, the cleaning of the pans 10, to occur only as needed, rather than during every cycle.

If a pan or article has a magnetic bottom surface but a non-magnetic top surface (or insufficient mass on its top surface to be held by a magnet), the top conveyer could be used as the first conveyor when the pan is to be inverted from it "upside-down" orientation to its "right-side-up" orientation. In this application, the feed belt would be elevated or inclined by an appropriate amount such that the feed belt (which supports the pan from underneath) discharges onto the bottom magnetic belt of the upper or first conveyor. When the rotating device is turned 180 degrees, the pan can be discharged from the first conveyor, which is now on the bottom, directly onto the removal belt.

Although the inverting device 100 is described herein with respect to baking pans 10, it is to be understood that other uses of the inverting device are possible, within the food preparation industry or in industries unrelated to food preparation.

While the invention has been described with reference to the drawings, it will be understood by those skilled in the art that various changes may be made and equivalents may be substituted for elements thereof without departing from the scope of the invention. As an example, the invention may be used with non-magnetic objects by altering the configuration of the rotating device or by replacing the magnets with vacuum heads which can create suction or with other types of devices to hold the objects in place. As another example, multiple pans or other items may be positioned in the rotating device at the same time. In addition, many modifications may be made to adapt a particular situation or material to the teachings of the invention without departing from the essential scope thereof. The particular configuration of the rotating device may vary and the manner of rotation may vary without departing from the invention. Therefore, it is intended that the invention not be limited to the particular embodiment disclosed as the best mode contemplated for carrying out this invention, but that the invention will include all embodiments falling within the scope of the appended claims.

What is claimed is:

1. A pan inverting apparatus for inverting magnetic baking pans, the pan inverting apparatus comprising:
   a rotating device rotatably mounted to a frame, the rotating device being rotatable about a transverse axis which extends through the center of the rotating device;
   a first conveyor positioned on the rotating device, the first conveyor having a first pan-receiving surface, the first conveyor having a first pan-engagement mechanism which engages respective magnetic baking pans and causes the respective magnetic baking pans to be maintained in position on the first pan-receiving surface as the rotating device is rotated and the respective magnetic baking pans are inverted, the first pan-engagement mechanism being a magnet which generates sufficient force to attract the respective magnetic baking pans on the first conveyor and to maintain the respective magnetic baking pans in the inverted position against the first pan-receiving surface as the pan inverting apparatus is rotated;
   a second conveyor positioned on the rotating device, the second conveyor having a second pan-receiving surface which is opposed to the first pan-receiving surface, the second conveyor having a second pan-engagement mechanism which engages respective magnetic baking pans and causes the respective magnetic baking pans to be maintained in position on the second pan-receiving surface as the rotating device is rotated and the respective magnetic baking pans are inverted, the second pan-engagement mechanism being a magnet which generates sufficient force to attract the respective magnetic baking pans on the second conveyor and to maintain the respective magnetic baking pans in the inverted position against the second pan-receiving surface as the an inverting apparatus is rotated;
   the first pan-receiving surface being spaced and maintained from the second pan-receiving surface a distance greater than the height of the respective magnetic baking pan to be inverted in the pan inverting apparatus.

2. The pan inverting apparatus as recited in claim 1, wherein the transverse axis extends through the center of the rotating device, both relative to the length and the depth of the rotating device.

3. The pan inverting apparatus as recited in claim 1, wherein the rotating device reciprocates about the transverse axis, first rotating in one direction and next rotating back in the opposite direction.

4. The pan inverting apparatus as recited in claim 1, wherein the rotating device remains substantially in the same position with the frame at all stopped positions.

5. The pan inverting apparatus as recited in claim 1, wherein the first pan-engagement mechanism is a permanent magnet.

6. The pan inverting apparatus as recited in claim 1, wherein the first pan-engagement mechanism is an electromagnet.

7. The pan inverting apparatus as recited in claim 1, wherein the first pan-receiving surface is provided on an inside surface of the first conveyor relative to an arc of rotation of the pan inverting apparatus, whereby the forces associated with the rotation of the rotating device force the respective baking pans toward the first pan-receiving surface, thereby applying additional forces to maintain the respective baking pans in engagement with the first pan-receiving surface.

8. The pan inverting apparatus as recited in claim 7, wherein the second pan-receiving surface is provided on an inside surface of the second conveyor relative to an arc of rotation of the pan inverting apparatus, whereby the forces associated with the rotation of the rotating device force the other respective baking pans toward the second pan-receiving surface, thereby applying additional forces to maintain the other respective baking pans in engagement with the second pan-receiving surface.

9. A pan inverting apparatus for inverting baking pans, the pan inverting apparatus comprising:
   a rotating device rotatably mounted to a frame, the rotating device being rotatable about an axis which extends through the rotating device;
   a first conveyor positioned on the rotating device, the first conveyor having a first pan-receiving surface, the first pan-receiving surface being provided on an inside surface of the first conveyor relative to the arc of rotation, the first conveyor having a first pan-engagement mechanism which engages respective baking pans and causes the respective baking pans to be maintained in position on the first pan-receiving surface as the rotating device is rotated and the respective baking pans are inverted, the first pan-engagement mechanism being a magnet which generates sufficient force to attract the respective baking pans on the first conveyor and to maintain the respective baking pans in the inverted position against the first pan-receiving surface as the pan inverting apparatus is rotated;
   a second conveyor positioned on the rotating device, the second conveyor having a second pan-receiving surface which is opposed to the first pan-receiving surface, the second pan-receiving surface being provided on an inside surface of the second conveyor relative to the arc of rotation, the second conveyor having a second pan-engagement mechanism which engages respective baking pans and causes the respective baking pans to be maintained in position on the second pan-receiving surface as the rotating device is rotated and the respective baking pans are inverted, the second pan-engagement mechanism being a magnet which generates sufficient force to attract the respective baking pans on the second conveyor and to maintain the respective baking pans in the inverted position against the second pan-receiving surface as the pan inverting apparatus is rotated;
   whereby the forces associated with the rotation of the rotating device force the baking pans toward the respective pan-receiving surfaces, thereby applying additional forces to maintain the baking pans in engagement with the respective pan-receiving surfaces.

10. The pan inverting apparatus as recited in claim 9, wherein the first pan-engagement mechanism is a permanent magnet.

11. The pan inverting apparatus as recited in claim 9, wherein the first pan-engagement mechanism is an electromagnet.

12. A pan inverting station for inverting baking pans which are received from a feed belt and discharged to a removal belt, the pan inverting station comprising:

a rotating device rotatably mounted to a frame of a pan inverting apparatus, the rotating device being rotatable about an axis which extends through the rotating device;

a first conveyor positioned on the rotating device, the first conveyor having a first pan-receiving surface, the first pan-receiving surface receiving respective baking pans from the feed belt when the rotating device is in a first position and discharging the respective baking pans to the discharge belt when the rotating device is in a second position, the first conveyor having a first pan-engagement mechanism which engages respective baking pans and causes the respective baking pans to be maintained in position on the first pan-receiving surface as the rotating device is rotated and the respective baking pans are inverted, the first pan-enqaqement mechanism being a magnet which generates sufficient force to attract the respective baking pans on the first conveyor and to maintain the respective baking pans in the inverted position against the first pan-receiving surface as the pan inverting apparatus is rotated;

a second conveyor positioned on the rotating device, the second conveyor having a second pan-receiving surface which is opposed to the first pan-receiving surface, the second pan-receiving surface receiving other respective baking pans from the feed belt when the rotating device is in the second position and discharging the other respective baking pans to the discharge belt when the rotating device is in the first position, the second conveyor having a second pan-engagement mechanism which engages other respective baking pans and causes the other respective baking pans to be maintained in position on the second pan-receiving surface as the rotating device is rotated and the other respective baking pans are inverted, the second pan-engagement mechanism being a magnet which generates sufficient force to attract the other respective baking pans on the second conveyor and to maintain the other respective baking pans in the inverted position as the pan inverting against the second pan-receiving surface apparatus is rotated;

whereby the pan inverting apparatus allows the baking pans to enter and leave the pan inverting apparatus at the same relative height, thereby facilitating the movement of the baking pans in a baking line in which the pan inverting apparatus is positioned.

13. The pan inverting station as recited in claim 12, wherein the first pan-engagement mechanism is a permanent magnet.

14. The pan inverting station as recited in claim 12, wherein the first pan-engagement mechanism is an electromagnet.

\* \* \* \* \*